(12) United States Patent
Vacek et al.

(10) Patent No.: US 12,192,375 B2
(45) Date of Patent: Jan. 7, 2025

(54) METHOD FOR GENERATING STATEFUL HASH BASED SIGNATURES OF MESSAGES TO BE SIGNED

(71) Applicants: THALES DIS FRANCE SA, Meudon (FR); THALES DIS CPL USA, INC., Belcamp, MD (US)

(72) Inventors: Jan Vacek, Meudon (FR); Aline Gouget, Meudon (FR); Michael Gardiner, Ontario (CA)

(73) Assignee: THALES DIS FRANCE SAS, Meudon (FR)

( * ) Notice: Subject to any disclaimer, the term of this patent is extended or adjusted under 35 U.S.C. 154(b) by 599 days.

(21) Appl. No.: 17/423,951

(22) PCT Filed: Nov. 13, 2019

(86) PCT No.: PCT/EP2019/081114
§ 371 (c)(1),
(2) Date: Jul. 19, 2021

(87) PCT Pub. No.: WO2020/126235
PCT Pub. Date: Jun. 25, 2020

(65) Prior Publication Data
US 2022/0086009 A1 Mar. 17, 2022

(30) Foreign Application Priority Data
Dec. 20, 2018 (EP) ..................................... 18306769

(51) Int. Cl.
*H04L 29/06* (2006.01)
*H04L 9/08* (2006.01)
*H04L 9/32* (2006.01)

(52) U.S. Cl.
CPC .......... *H04L 9/3247* (2013.01); *H04L 9/0869* (2013.01); *H04L 9/0877* (2013.01); *H04L 9/3239* (2013.01)

(58) Field of Classification Search
None
See application file for complete search history.

(56) References Cited

U.S. PATENT DOCUMENTS 10,116,450 B1 * 10/2018 Brown ................... H04L 9/3239
10,496,616 B2 * 12/2019 Zhang ..................... G06F 16/27
(Continued)

OTHER PUBLICATIONS

Andreas Hlsing, "Forward Secure Signatures on Smart Cards" Sep. 27, 2018, International Association for Cryptologic Research, vol. 20181002:040136, p. 1-19 (Year: 2018).*
(Continued)

*Primary Examiner* — William A Corum, Jr.

(57) ABSTRACT

Generation of stateful hash based signatures of messages to be signed in a key management system including a plurality of tamper-proof computing devices by a manager device of generating a master merkle tree, triggering generating a predetermined number of slave merkle trees, for each message to be signed selecting a tamper-proof computing device for signing, assigning one yet unassigned generated slave merkle tree to said selected tamper-proof computing device, generating and sending to said selected tamper-proof computing device a command comprising said message to be signed, data enabling to obtain an OTS private key of the assigned slave merkle tree to be used to generate an OTS signature of the message to be signed, and a state value associated to said assigned slave merkle tree and keeping track of the OTS private keys of said assigned slave merkle tree already used for generating a signature.

12 Claims, 3 Drawing Sheets

(56) References Cited

U.S. PATENT DOCUMENTS 11,184,157 B1* 11/2021 Gueron .................... H04L 9/14
2017/0230182 A1* 8/2017 Misoczki ............. H04L 9/3255

OTHER PUBLICATIONS

PCT/EP2019/081114, International Search Report, Nov. 20, 2020, European Patent Office, P.B. 5818 Patentlaan 2 NL—2280 HV Rijswijk.

PCT/EP2019/081114, Written Opinion of the International Searching Authority, Nov. 20, 2020, European Patent Office, D-80298 Munich.

Andreas Alsing et al: "Forward Secure Signatures on Smart Cards", IACR, International Association for Cryptologic Research, vol. 20181002:040136 (Sep. 27, 2018), pp. 1-19, XP061026487, Retrieved from the Internet: URL:http://eprint.iacr.org/2018/924.pdf [retrieved on Sep. 27, 2018] abstract Section 3, paragraph 1-4.

Huelsing Tu Eindhoven D Butin Tu Darmstadt S Gazdag Denua GMBH J Rijneveld Radboud University a Mohaisen University of Central Flo: "XMSS: eXtended Merkle Signature Scheme; rfc8391.txt",XMSS: Extended Merkle Signature Scheme;RFC8391. TXT, Internet Engineering Task Force, IEFE; Standard, Internet Society (ISOC) 4, Rue Des Falaises CH—1205 Geneva, Switzerlan, (Jun. 1, 2018), pp. 1-74, XP015126339, pp. 1,3,33, pp. 34,36,37, p. 39.

Rachid El Bansarkhani, et al., G-Merkle: A Hash-Based Group Signature Scheme from Standard Assumptions, Springer International Publishing AG, part of Springer Nature 2018 T. Lange and R. Steinwandt (Eds.): PQCrypto 2018, LNCS 10786, pp. 441-463, 2018. https://doi.org/10.1007/978-3-319-79063-3_21.

Andreas Hulsing, et al., Hash-based Signatures: An Outline for a New Standard, Jul. 1, 2022, Published 2014, https://csrc.nist.gov/csrc/media/events/workshop-on-cybersecurity-in-a-post-quantum-world/documents/papers/session5-hulsing-paper.pdf.

* cited by examiner

METHOD FOR GENERATING STATEFUL HASH BASED SIGNATURES OF MESSAGES TO BE SIGNED

FIELD OF THE INVENTION

The present invention relates to the field of signature schemes, and of associated cryptographic devices, and more particularly to hash-based signature schemes.

BACKGROUND OF THE INVENTION

The increasing computational power of quantum computers is a growing threat to the security of classical signature schemes such as RSA or ECDSA. Such signature schemes will eventuality be completely defenseless against attacks performed using quantum computers. Therefore, work is being done to develop new efficient signature schemes that would be resistant against such attacks.

Hash-based signature schemes have been proved resistant to quantum computer attacks. A major drawback of some signature schemes is that each private key used for generating signatures must be used only once in order to prevent generation of forged signatures by an attacker. Consequently, hash-based signature schemes have been developed using private keys as One Time Signature (OTS) keys.

Issuing a certificate for a different public key for each private key used as OTS key would be very cumbersome. Therefore, structures called Merkle trees have been developed which enable multiple OTS private keys to be related to a single public key for which a certificate has been issued. Nevertheless, even when using Merkle trees, each OTS private key of a Merkle tree shall be used only once for generating a signature. Therefore a value, called state value, must be updated after each signature generation in order to keep track of the OTS private keys already used for generating a signature. This value is very sensitive and shall be protected since should the attacker be able to alter it, it would allow him to use an OTS key twice.

Using such a state value, and preventing it from being tampered with, makes it difficult with hash-based signatures to have several entities generating in parallel signatures depending on the same public key. Indeed, contrarily to schemes such as RSA or ECDSA in which the same private key may be used by several entities to generate multiple signatures in parallel, in a hash-based signature scheme no entity should generate a signature using the same private key as another entity, which requires to synchronize the state value between said several entities. In case of synchronization error, two entities may generate in parallel a signature using the same OTS private key, which may compromise any further use of the corresponding public key.

Consequently, there is a need for a hash-based signature scheme enabling to make several entities generate in parallel signatures related to a single public key, while avoiding a state synchronization between these entities which may lead to using twice the same OTS private key for generating a signature in case of synchronization issue.

SUMMARY OF THE INVENTION

For this purpose and according to a first aspect, this invention therefore relates to a method for generating stateful hash based signatures of messages to be signed in a key management system (KMS) comprising a plurality of tamper-proof computing devices (HSM),
said method comprising, performed by a manager device of the key management system (KMS):
generating a master merkle tree, the root of the master merkle tree being a master public signature key and the leaves of the master merkle tree being master One-Time Signature (OTS) public keys, associated to master OTS private keys,
triggering generating a predetermined number of slave merkle trees, wherein each leaf of a slave merkle tree is an OTS public key associated to an OTS private key, said predetermined number of slave merkle trees being equal to the number of tamper-proof computing devices and each generated slave merkle tree having its root signed by one of the master OTS private keys of the master merkle tree to build-up a multi-tree structure,
for each message to be signed:
selecting a tamper-proof computing device (HSM) for signing,
assigning one yet unassigned generated slave merkle tree to said selected tamper-proof computing device (HSM),
generating and sending to said selected tamper-proof computing device (HSM) a command comprising said message to be signed, data enabling to obtain an OTS private key of the assigned slave merkle tree to be used to generate an OTS signature of the message to be signed, and a state value associated to said assigned slave merkle tree and keeping track of the OTS private keys of said assigned slave merkle tree already used for generating a signature,
such that the selected tamper-proof computing device (HSM) obtains an OTS private key and generates an OTS signature of said message to be signed with said obtained OTS private key,
and such that a stateful hash based signature of said message to be signed is generated from said generated OTS signature using an authentication path, in the slave merkle tree assigned to said selected tamper-proof computing device (HSM), of the OTS public key corresponding to said obtained OTS private key,
said generated stateful hash based signatures being configured to be verified by a verification process which uses as only public signature key the master public signature key at the root of the master merkle tree.

According to a second aspect, this invention therefore relates also to a method for generating stateful hash based signatures of messages to be signed in a key management system (KMS) comprising a manager device and a plurality of tamper-proof computing devices (HSM),
said method comprising:
generating, by said manager device, a master merkle tree, the root of the master merkle tree being a master public signature key and the leaves of the master merkle tree being master One-Time Signature (OTS) public keys, associated to master OTS private keys,
triggering, by said manager device, generating a predetermined number of slave merkle trees, wherein each leaf of a slave merkle tree is an OTS public key associated to an OTS private key, said predetermined number of slave merkle trees being equal to the number of tamper-proof computing devices and each generated slave merkle tree having its root signed by one of the master OTS private keys of the master merkle tree to build-up a multi-tree structure,
for each message to be signed:
selecting, by said manager device, a tamper-proof computing device (HSM) for signing, assigning, by said manager device, one yet unassigned generated slave merkle tree to said selected tamper-proof computing device (HSM), generating and sending, by said manager device to said selected tamper-proof computing device (HSM) a command comprising said message to be signed, data enabling to obtain an OTS private key of the assigned slave merkle tree to be used to generate an OTS signature of the message to be signed, and a state value associated to said assigned slave merkle tree and keeping track of the OTS private keys of said assigned slave merkle tree already used for generating a signature, obtaining, by said selected tamper-proof computing device (HSM), an OTS private key from said data enabling to obtain an OTS private key, generating, by said selected tamper-proof computing device (HSM), an OTS signature of said message to be signed with said obtained OTS private key, updating, by said selected tamper-proof computing device (HSM), said state value associated to said assigned slave merkle tree such that said obtained OTS private key cannot be used anymore for generating signatures, generating a stateful hash based signature of said message to be signed from said generated OTS signature using an authentication path, in the slave merkle tree assigned to said selected tamper-proof computing device (HSM), of the OTS public key corresponding to said obtained OTS private key, said generated stateful hash based signatures being configured to be verified by a verification process which uses as only public signature key the master public signature key at the root of the master merkle tree.

It enables to generate all the signatures of the messages to be signed in parallel, without any risk of using twice the same OTS private key; in a way that enables to verify all the generated signatures with a single public key.

The state value may be protected for the authenticity of the value or is encrypted.

This enables to prevent any reusing of already used OTS private key that could be triggered by an attacker providing a forged state value to a HSM.

In a first embodiment, the method according to the second aspect may comprise:

generating, by said selected tamper-proof computing device, said stateful hash based signature from said authentication path and said generated OTS signature.

In this first embodiment, the method may comprise:

obtaining, by said tamper-proof computing device, said slave merkle tree assigned to said tamper-proof computing device, generating, by said tamper-proof computing device, said authentication path from said obtained slave merkle tree.

In a first case, said slave merkle tree assigned to said tamper-proof computing device may be stored in said tamper-proof computing device.

By doing so, the slave merkle trees are securely stored in the HSMs, which decreases the risk of an attacker accessing this data.

In a second case, the method may comprise:

sending, by said manager device to said tamper-proof computing device, a seed, generating from said seed, by said tamper-proof computing device, the OTS private keys of the slave merkle tree assigned to said tamper-proof computing device using a pseudorandom generator, and said slave merkle tree based on said generated OTS private keys.

Generating the merkle tree in the HSM from a seed decreases the amount of data to be transmitted from the manager device to the KMS, and may limit the amount of NVM used in the HSM for storing such data.

In a third case, said slave merkle tree may be stored in a database of the KMS and said tamper-proof computing device may obtain said stored slave merkle tree from said KMS database.

By doing so, less NVM is used in the HSM than in the case where the slave merkle tree is permanently stored in the HSM, and no computation is required from the HSM for getting access to the slave merkle tree it has been assigned.

In a second embodiment, the method according to the second aspect, wherein said key management system comprising further a KMS computing device, may comprise:

sending, said generated OTS signature, by said selected tamper-proof computing device to said KMS computing device, generating, by said KMS computing device, said stateful hash based signature from said authentication path and said generated OTS signature.

By doing so, the generation of the signature from the OTS signature is not performed by the HSM, which saves CPU time of the HSM.

Data enabling to obtain an OTS private key may be among: a seed enabling to generate OTS private keys with a pseudorandom generator, said OTS private key, or an identifier of said OTS private key.

Said step of managing said state value may comprise, after generation of said OTS signature by said selected tamper-proof computing device:

sending, from said selected tamper-proof computing device, said updated state value to said manager device.

By doing so, the manager device is kept informed of which OTS private keys have been used for generating signatures.

According to a third aspect, this invention therefore relates also to a computer program product directly loadable into the memory of at least one computer, comprising software code instructions for performing the steps of the method according to the first or second aspect when said product is run on the computer.

According to a fourth aspect, this invention therefore relates also to a manager device configured for making a plurality of tamper-proof computing devices (HSM) generate stateful hash based signatures of messages to be signed in a key management system (KMS), and comprising a processor and an input-output interface configured for performing the steps of the method according to the first aspect.

According to a fifth aspect, this invention therefore relates also to a key management system (KMS) comprising: the manager device according to the fourth aspect and a plurality of tamper-proof computing devices (HSM) configured for performing the steps of the method according to the second aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 1 is a schematic illustration of a KMS system according to an embodiment of the present invention.

DETAILED DESCRIPTION OF EMBODIMENTS OF THE INVENTION

The invention relates to methods, and associated devices, for generating stateful hash based signatures of several messages to be signed.

Figure 1:
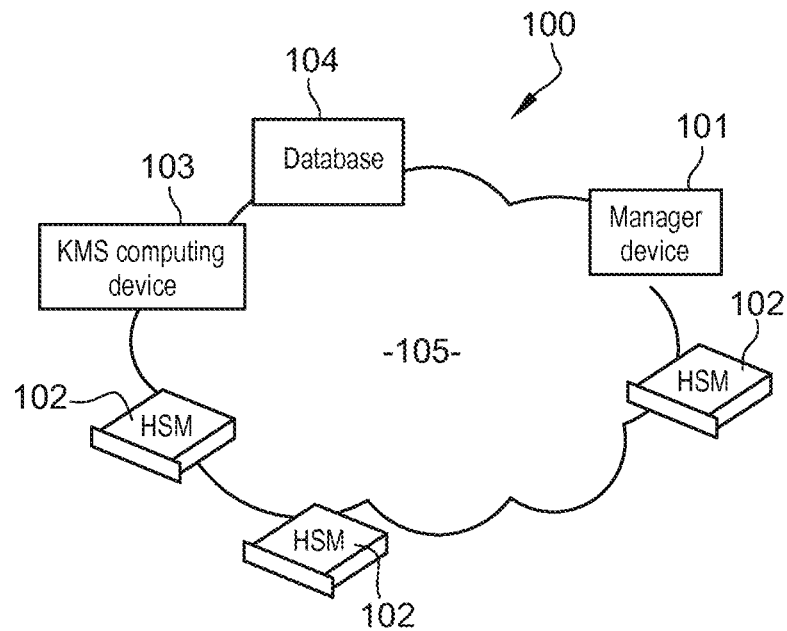

As described on FIG. 1, such a signature generation takes place in a key management system KMS 100, comprising a manager device 101. Such a device may for example be a personal computer or a server. It may also be a tamper-proof device such as a Hardware Security Module HSM.

Hash based signatures generation is based on an OTS signature scheme. Therefore, the KMS 100 also includes a plurality of tamper-proof computing devices 102, in charge of generating an OTS signature, using an OTS private key, for each message to be signed.

Such tamper-proof computing devices may for example be Hardware Security Modules HSM. Such a HSM is a tamper resistant hardware device, extremely difficult to access for unauthorized users. It enables to securely store cryptographic keys, and to securely perform cryptographic operations. Therefore it can securely perform OTS generation using OTS private keys while preventing any access by an attacker to these OTS private keys. In the following paragraph, the abbreviation HSM will refer to any kind of tamper-proof computing device and shall not be understood as limited to a Hardware Security Module per se.

Figure 2:
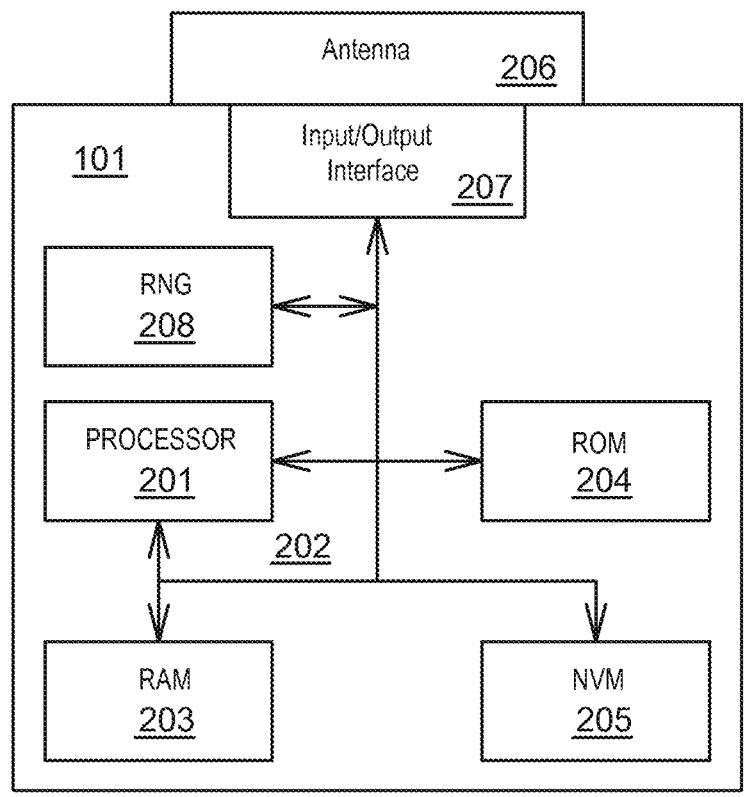
FIG. 2 is a schematic illustration of a manager device according to an embodiment of the present invention.

FIG. 2 is a schematic illustration of such a manager device 101. It may include a processor 201 connected via a bus 202 to a random access memory (RAM) 203, a read-only memory (ROM) 204, and/or a non-volatile memory (NVM) 205. It may further include an antenna 206 or a connector connected to the bus and by which it may be connected to such an antenna. Such an antenna may be used to connect the node to various forms of wireless networks, e.g., wide-area networks, WiFi networks, or mobile telephony networks for exchanging messages with other devices of the KMS. Alternatively, the manager device may connect to networks via wired network connections such as Ethernet. It may also include an input-output interface 207 providing interfaces to an administrator, such as one or more screens, loudspeakers, a mouse, tactile surfaces, a keyboard etc. . . . .

Each manager device may also comprise a pseudo random number generator (PRNG) 208 for generating random numbers to be used in cryptographic operations.

The tamper proof computing devices 102 may have the same architecture and include the same elements.

The KMS 100 may also include a KMS computing device 103 in charge of issuing the hash-based signatures of the messages to be signed, based on the OTS signatures issued by the HSMs, when these signatures are not issued by the HSMs themselves. Such a KMS computing device may for example be a personal computer, a server or a tamper-proof device such as a HSM.

The KMS 100 may also include a database 104 storing data needed during the signature process but not stored in the HSMs.

The KMS also includes a computer network 105 interconnecting the manager device, the HSMs and the other devices included in the KMS such as the database or the KMS computing device. Such a network may be a wired network such as an Ethernet network, or a wireless network such as a Wifi network.

In the method described here below, all the data transmitted from one device of the KMS to another device of the KMS using the computer network 105 may be encrypted in order to prevent any attacker from getting knowledge of such data.

The main goal of the invention is to enable several HSMs of the KMS to sign different messages in parallel, without waiting for a HSM to issue a signature for a message before starting the message signature process of another message; and to use, for such signatures, OTS private keys that are all related to the same public key, such that this public key may be used to verify all the signatures issued using these OTS private keys; and to avoid any risk of using the same OTS private key twice.

Figure 3:
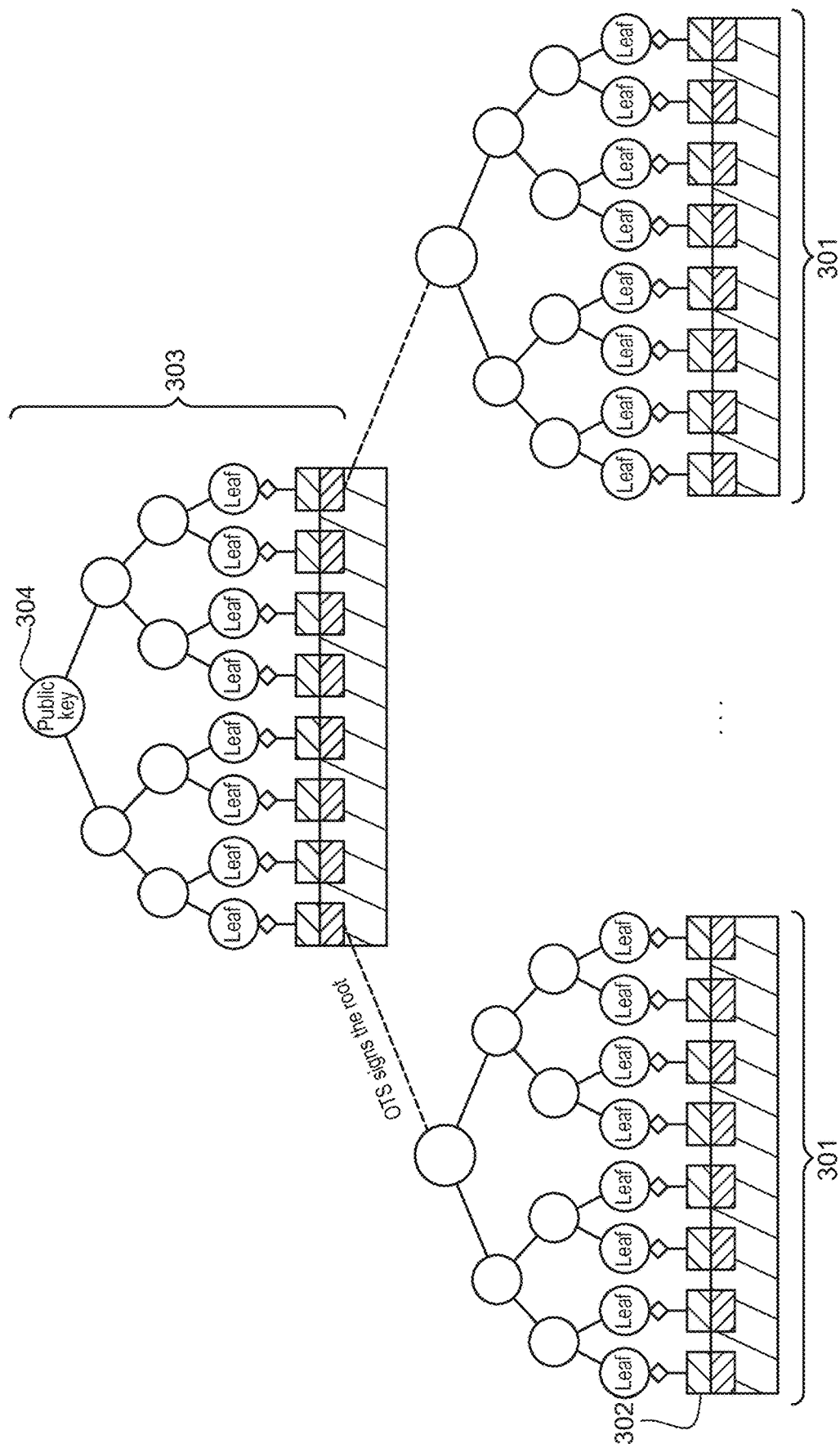
FIG. 3 is a schematic illustration of a multi tree structure used according to an embodiment of the present invention.

In order to do so, as shown on FIG. 3, the main idea of the invention is to use Merkle trees 301 having OTS keys as leaves 302 and to assign one Merkle tree to one HSM, such that no Merkle tree is ever assigned to two different HSMs at the same time. By doing so, when a signature of a message to be signed shall be issued by a HSM, this HSM can use for the signature any OTS key of the Merkle tree identified by the Merkle Tree state value as not already used for a signature, without any risk that another HSM uses the same OTS key for generating another signature at the same time.

In order to have all the OTS private keys of these Merkle trees 301 related to a single public key, each top node of these Merkle trees, called slave Merkle trees, is signed by an OTS private key of a master Merkle tree 303 whose top node 304 is a public key for which a certificate has been issued, called master public signature key. By doing so, any signature issued by a HSM using an OTS key of any one of the slave Merkle trees can be verified using the master public signature key.

Such a tree configuration defines a multi-tree structure having two layers: a first layer including the master Merkle tree, and a second layer including all the slave Merkle trees. Such a configuration is not limiting and the invention also encompasses using a multi-tree structure with more than two layers, which may be designed by considering that any master or slave tree may itself be a multi-tree structure with at least two layers.

Figure 4A:
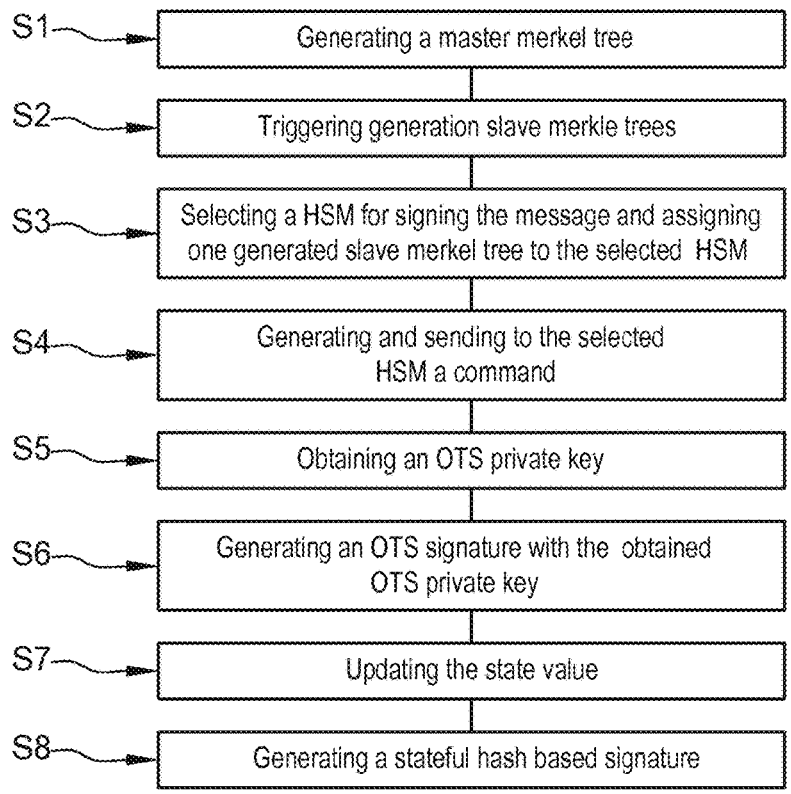
FIGS. 4a and 4b illustrate schematically a method for generating stateful hash based signatures of messages to be signed in a key management system (KMS) comprising a plurality of tamper-proof computing devices (HSM) according to an embodiment of the present invention.
Figure 4B:
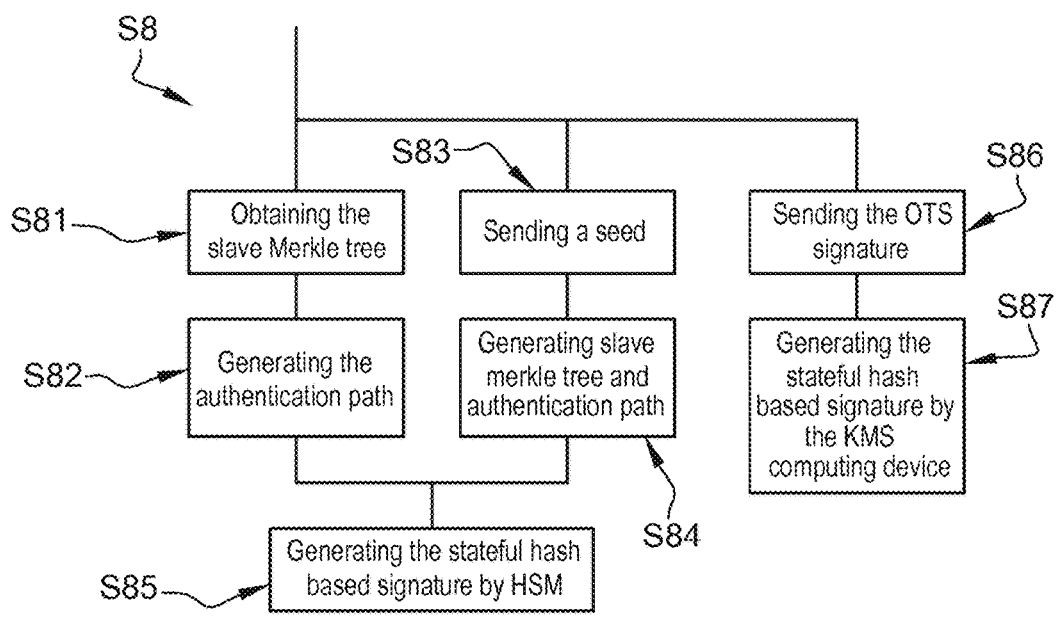

The following paragraphs describe with more details the steps of the methods of the invention for generating in parallel signatures for at least two messages to be signed, as described in FIGS. 4a and 4b. In these paragraphs, the plurality of tamper-proof computing devices comprises two or more HSMs that are asked to issue these signatures in parallel by the manager device. This configuration is not limiting and the plurality of tamper-proof computing devices 102 may comprise additional HSMs that are not involved in the steps of the methods described hereunder but that may issue similarly signatures for other messages at a later time.

In the following paragraphs, the expressions "OTS private key" and "OTS public key" always refer to the OTS private and public keys of the slave merkle trees, unless stated otherwise.

During a first step S1, the manager device of the KMS generates a master merkle tree 303. The root of the master merkle tree is a master public signature key, for which a certificate is issued, and the leaves of the master merkle tree are One-Time Signature (OTS) public keys called master OTS public keys, associated to master OTS private keys. The master merkle tree and its master OTS private keys may be stored in the KMS database, preferably under an encrypted form.

During a second step S2, the manager device of the KMS triggers the generation of a predetermined number of slave merkle trees 301. Each leaf of a slave merkle tree is an OTS public key associated to an OTS private key. These are the keys that will be used by the HSM to issue signatures of the messages to be signed.

In order to protect said OTS private keys, OTS public keys shall be generated from the OTS private keys by a tamper-proof device.

If the manager device is a tamper-proof device, it may generate itself the OTS public keys and the slave Merkle trees from OTS private keys.

If it is not, the OTS public keys may be generated by a tamper-proof device. In a first embodiment, the tamper-proof device may send only the OTS public keys to the manager device. In such a case the manager device may then generate the slave merkle trees from the OTS public keys. In a second embodiment, the tamper-proof device may also generate the slave Merkle trees.

As explained here above, the plurality of tamper-proof computing devices comprises only the HSMs that will be asked by the manager device to issue these signatures in parallel; therefore said predetermined number of slave merkle trees is equal to the number of tamper-proof computing devices.

In an alternate configuration in which the KMS would include additional HSMs, the manager device may generate less salve merkle trees that the total number of HSMs in the KMS.

In both cases, this predetermined number may be understood as the maximum number of HSMs allowed to perform a signature process in parallel.

In order to have all the OTS private keys of these slave Merkle trees 301 related to the master public signature key of the master merkle tree, the root node of each generated slave merkle tree is signed by one of the master OTS private keys of the master merkle tree to build-up a multi-tree structure. These signatures and the authentication paths, called hereafter master authentication path, in the master Merkle tree, of the master OTS public keys corresponding to the master OTS private keys used to generate these signatures, shall be made available to the devices of the KMS generating signatures of messages to be signed. In order to do so, they may be stored in the KMS database.

As explained above, in order to avoid issuing two signatures with the same OTS private key, each slave Merkle tree shall be assigned to a single HSM at a time.

In a first embodiment, such an assignment is permanent. In such a case the signatures issued using the OTS private keys of a given merkle tree will all be issued by the same HSM. Such an assignment may be performed before any message to be signed is received by the KMS.

In another embodiment, such an assignment may be dynamic. Each slave merkle tree may be assigned to a HSM just for the issuance of one signature. The same slave merkle tree may be assigned to another HSM for another signature issuance at a later time, after the issuance process of the first signature is over. In such an embodiment, such an assignment may be performed in response to receiving a message to be signed.

Therefore, during a third step S3, for each message to be signed, the manager device selects a tamper-proof computing device for signing the message and assigns one generated slave merkle tree to the selected tamper-proof computing device.

The manager device may not receive all the messages to be signed in parallel at the same time but one after the other. As a result, it may performs the third step S3, or at least the selection action of this step, repeatedly after each reception of one or more messages to be signed.

Similarly, the following steps describe the actions performed for generating a signature of a message to be signed and may be repeated as much as required for obtaining all the signatures to be generated.

When slave merkle trees assignment to the HSMs is permanent, each slave merkle tree and its associated OTS private keys may be stored in the NVM of the HSM it has been assigned to.

Alternatively, the slave merkle trees and the associated OTS private keys may be stored in the KMS database and the HSMs obtain it from the KMS database when needed.

Preferably, all the slave merkle trees and their OTS private keys are stored under an encrypted form.

Then, during a fourth step S4, for each message to be signed, the manager device generates and sends to the selected tamper-proof computing device (HSM) a command comprising the message to be signed, data enabling to obtain an OTS private key of the assigned slave merkle tree to be used to generate an OTS signature of the message to be signed, and a state value associated to said assigned slave merkle tree and keeping track of the OTS private keys of said assigned slave merkle tree already used for generating a signature.

During a fifth step S5 the tamper-proof computing device of said plurality of tamper-proof computing devices (HSM) obtains an OTS private key from said data enabling to obtain an OTS private key.

Such data enabling to obtain an OTS private key may be a seed enabling to generate OTS private keys with a pseudorandom generator (PRNG). In such a case, a HSM may generate the OTS private key to be used for the signature from this seed using his PRNG.

Such data enabling to obtain an OTS private key may also be the OTS private key itself, particularly when the slave merkle trees and associated OTS private keys are stored in the KMS database.

Such data enabling to obtain an OTS private key may also be an identifier of the OTS private key to be used, particularly when the slave merkle trees and associated OTS private keys are stored in the HSMs to which they have been assigned.

During a sixth step S6, the tamper-proof computing device of said plurality of tamper-proof computing devices (HSM) generates an OTS signature of a message to be signed with the OTS private key it has obtained from the data enabling to obtain an OTS private key. Such a generation depends on the chosen OTS signature scheme which may for example be Winternitz, WOTS+, LM-OTS or Lamport signature scheme.

During a seventh step S7, the tamper-proof computing device of said plurality of tamper-proof computing devices (HSM) updates the state value associated to the slave merkle tree it was assigned, such that the obtained OTS private key used for generating the OTS signature at the previous step cannot be used anymore for generating signatures.

Before and after such an update, the state value may be encrypted. It shall at least be protected such that its authenticity is guaranteed.

The seventh step S7 may also include sending back to the manager device the updated state value. This is mandatory when slave merkle tree assignment is not permanent. Indeed, in such a case, the manager device needs to get the state value back in order to prevent the OTS private key used by the HSM to be used again later when the same slave merkle tree will be assigned to another HSM for issuing another signature.

This is optional when slave merkle tree assignment is permanent. In such a case, each HSM manages its own slave merkle tree and state value until all OTS private keys of its slave merkle tree have been used. In such a case the state value may be sent back to the manager device for information.

During an eighth step S8, a stateful hash based signature of the message to be signed is generated from the OTS signature generated by the HSM.

In order to obtain a generated stateful hash based signature that can be verified by a verification process which uses as only public signature key the master public signature key at the root of the master merkle tree, such a signature includes:
- the OTS signature of the message to be signed generated at the sixth step S6,
- the authentication path, in the slave merkle tree assigned to the tamper-proof computing device (HSM), of the OTS public key corresponding to said OTS private key used by the HSM for generating the OTS signature,
- the signature of the root node of the slave merkle tree assigned to the HSM, and
- the master authentication path of the master OTS public key corresponding to the master OTS private key used to generate said signature of said root node.

The stateful hash based signature of the message to be signed may be generated by the HSM itself, or outside the HSM.

In a first case, the HSM needs to know the authentication path, in the slave merkle tree assigned to itself, of the OTS public key corresponding to the OTS private key the HSM used during the sixth step S6 for generating the OTS signature.

The HSM may compute itself the needed authentication path from its slave Merkle tree.

In a first embodiment, the method according to the invention may comprise a tree transfer step S81 during which the HSM obtains the slave Merkle tree that has been assigned to the HSM, for example from the manager device of the KMS, and an authentication path generation step S82 during which the HSM generates the authentication path from the slave merkle tree it obtained.

In the case where slave merkle tree assignment to the HSMs is permanent and the slave merkle trees are stored in the HSMs, this tree transfer step S81 may be performed right after the slave Merkle trees are generated during the second step S2.

In a second embodiment, the HSM may regenerate its slave Merkle tree from a seed and compute itself the needed authentication path from its slave Merkle tree.

In such a case, the method according to the invention may comprise a seed transfer step S83 during which the manager device sends to the HSM a seed, and a merkle tree generation step S84 during which the HSM generates the OTS private keys of the slave merkle tree assigned to itself using its pseudorandom generator, and then said slave merkle tree based on said generated OTS private keys. This step may include the generation by the HSM of the authentication path from the slave merkle tree it obtained, as in the first embodiment.

In these two embodiments, the eighth step ends by a HSM signature step S85 during which the HSM generates the stateful hash based signature of the message to be signed from the OTS signature generated by the HSM, the obtained authentication path, the signature of the root node of the slave merkle tree assigned to the HSM, and the master authentication path of the master OTS public key corresponding to the master OTS private key used to generate said signature of said root node.

In a second case, when the stateful hash based signature of the message to be signed is not generated by the HSM itself, it may be generated by the KMS computing device. In such a case, the method according to the invention may comprise an OTS signature transfer step S86 during which the HSM sends the OTS signature it has generated to the KMS computing device.

In order to generate the stateful hash based signature, the KMS computing device also needs the authentication path, in the slave merkle tree assigned to the HSM, of the OTS public key corresponding to the OTS private key used by the HSM during the sixth step S6 for generating the OTS signature. During the OTS signature transfer step S86, the HSM may send this authentication path to the KMS computing device. Alternatively, the HSM may send only the OTS public keys of the slave merkle tree required for computing this authentication path, and the KMS computing device may compute the authentication path based on the sent OTS public keys.

The method according to the invention may also comprise a KMS signature step S87 during which the KMS computing device generates the stateful hash based signature of the message to be signed from said authentication path, said OTS signature generated by the HSM, the signature of the root node of the slave merkle tree assigned to the HSM, and the master authentication path of the master OTS public key corresponding to the master OTS private key used to generate said signature of said root node.

According to a second aspect, the invention is also related to a computer program product directly loadable into the memory of at least one computer, comprising software code instructions for performing the steps of the method of generating in parallel signatures for at least two messages to be signed as described above when said product is run on the computer.

According to a third aspect, the invention is also related to a manager device as described above, configured for making a plurality of tamper-proof computing devices (HSM) generate stateful hash based signatures of messages to be signed in a key management system (KMS), and comprising a processor and an input-output interface configured for performing the steps of the method of generating in parallel signatures for at least two messages to be signed as described above.

According to a fourth aspect, the invention is also related to a key management system (KMS) as described above comprising a manager device as described above and a plurality of tamper-proof computing devices (HSM) configured for performing the steps of the method of generating in parallel signatures for at least two messages to be signed as described above.

As a result, the signatures of the messages to be signed are generated in parallel by the plurality of HSMs, without any risk of using twice the same OTS private key since each HSM is assigned a different slave Merkle tree; and yet all the generated signatures may be verified using a single public key, which is the master public signature key.

The invention claimed is:

1. A method for operating a key management system ("KMS") including a manager device and a number greater than one of tamper-proof computing devices, to generate stateful hash-based signatures of messages to be signed in the key management system, wherein the manager device and tamper-proof computing devices respectively comprise a processor and memory, the memory storing instructions which when executed by the respective processor causes the respective processor to perform respective steps of said method, said method comprising:
generating, by said manager device, a master merkle tree having a root and leaves, the root of the master merkle tree being a master public signature key and the leaves of the master merkle tree being master One-Time Signature ("OTS") public keys, associated with master OTS private keys,
triggering, by said manager device, generation of a predetermined number of slave merkle trees, wherein each leaf of the slave merkle trees is an OTS public key associated with an OTS private key, said predetermined number of slave merkle trees being equal to the number of tamper-proof computing devices and each generated slave merkle tree has its root signed by one of the master OTS private keys of the master merkle tree to build-up a multi-tree structure,
for each message to be signed:
selecting, by said manager device, one of the signing tamper-proof computing devices for signing,
dynamically assigning, by said manager device, one yet unassigned generated slave merkle tree to said signing tamper-proof computing device for the issuance of one signature only,
generating and sending, by said manager device to said signing tamper-proof computing device a command comprising said message to be signed, data enabling obtaining the OTS private key of the assigned slave merkle tree to be used to generate an OTS signature of the message to be signed, and a state value associated to said assigned slave merkle tree and keeping track of the OTS private keys of said assigned slave merkle tree already used for generating a signature,
obtaining, by said signing tamper-proof computing device, a signing OTS private key from said data enabling obtaining the OTS private key,
generating, by said signing tamper-proof computing device, a generated OTS signature of said message to be signed with said signing OTS private key,
updating, by said signing tamper-proof computing device, said state value associated to said assigned slave merkle tree such that said signing OTS private key cannot be used anymore for generating signatures,
generating a stateful hash based signature of said message to be signed from said generated OTS signature using an authentication path, in the slave merkle tree assigned to said signing tamper-proof computing device, of the OTS public key corresponding to said signing OTS private key,
said stateful hash based signatures being configured to be verified by a verification process which uses the master public signature key as the only public signature key.

2. The method of claim 1, wherein the state value is protected for authenticity or is encrypted.

3. The method of claim 1, comprising:
generating, by said signing tamper-proof computing device, said stateful hash based signature from said authentication path and said generated OTS signature.

4. The method of claim 3, comprising:
obtaining, by said signing tamper-proof computing device, said slave merkle tree assigned to said signing tamper-proof computing device,
generating, by said signing tamper-proof computing device, said authentication path from said slave merkle tree assigned to said signing tamper-proof computing device.

5. The method of claim 4, wherein said slave merkle tree assigned to said signing tamper-proof computing device is stored in said signing tamper-proof computing device.

6. The method of claim 4, comprising:
sending, by said manager device to said signing tamper-proof computing device, a seed,
generating from said seed, by said signing tamper-proof computing device, the generated OTS private keys of the slave merkle tree assigned to said signing tamper-proof computing device using a pseudorandom generator, and said slave merkle tree based on said generated OTS private keys.

7. The method of claim 4, wherein said slave merkle tree assigned to said signing tamper-proof computing device is stored in a database of the KMS and wherein said tamper-proof computing device obtains said stored slave merkle tree from said database of said KMS.

8. The method of claim 1, wherein said key management system further comprises a second KMS computing device, comprising:
sending, said generated OTS signature, by said signing tamper-proof computing device to said second KMS computing device,
generating, by said second KMS computing device, said stateful hash based signature from said authentication path and said generated OTS signature.

9. The method of claim 1, wherein the data enabling obtaining the OTS private key are among: a seed enabling generation of the OTS private keys with a pseudorandom generator, said OTS private key, or an identifier of said OTS private key.

10. The method of claim 1, wherein said step of updating said state value comprises, after generation of said OTS signature by said signing tamper-proof computing device:
sending, from said signing tamper-proof computing device, said state value to said manager device.

11. A non-transitory memory comprising a computer program product directly loadable into a memory of at least one computer, the computer program product having software code instructions for performing a method for generating stateful hash based signatures of messages to be signed in a key management system ("KMS") including a manager device and a plurality of tamper-proof computing devices, wherein the manager device and tamper-proof computing devices respectively comprise a processor and memory, the respective memory storing said software code instructions, the software code instructions comprising instructions to cause the respective processors to:
- generate, by said manager device, a master merkle tree having a root and leaves, the root of the master merkle tree being a master public signature key and the leaves of the master merkle tree being master One-Time Signature ("OTS") public keys, associated with master OTS private keys,
- trigger, by said manager device, generation of a predetermined number of slave merkle trees, wherein each leaf of the slave merkle trees is an OTS public key associated with an OTS private key, said predetermined number of slave merkle trees being equal to the number of tamper-proof computing devices and each generated slave merkle tree has its root signed by one of the master OTS private keys of the master merkle tree to build-up a multi-tree structure,
- for each message to be signed:
  - select, by said manager device, one of the signing tamper-proof computing devices for signing,
  - dynamically assign, by said manager device, one yet unassigned generated slave merkle tree to said signing tamper-proof computing device for issuance of one signature only,
  - generate and sending, by said manager device to said signing tamper-proof computing device a command comprising said message to be signed, data enabling obtaining the OTS private key of the assigned slave merkle tree to be used to generate an OTS signature of the message to be signed, and a state value associated to said assigned slave merkle tree and keeping track of the OTS private keys of said assigned slave merkle tree already used for generating a signature,
  - obtain, by said signing tamper-proof computing device, a signing OTS private key from said data enabling to obtain an obtaining the an OTS private key,
  - generate, by said signing tamper-proof computing device, an OTS signature of said message to be signed with said signing OTS private key,
  - update, by said signing tamper-proof computing device, said state value associated to said assigned slave merkle tree such that said obtained OTS private key cannot be used anymore for generating signatures,
  - generate a stateful hash based signature of said message to be signed from said generated OTS signature using an authentication path, in the slave merkle tree assigned to said signing tamper-proof computing device, of the OTS public key corresponding to said obtained OTS private key,
- said generated stateful hash based signatures being configured to be verified by a verification process which uses the master public signature key at the root of the master merkle tree as the only public signature key.

12. A key management system (KMS) comprising a manager device and a number greater than one of tamper-proof computing devices, wherein the manager device and tamper-proof computing devices respectively comprise a processor and memory, the respective memory storing instructions which when executed by the respective processor causes the respective processor to perform:
- generate, by said manager device, a master merkle tree having a root and leaves, the root of the master merkle tree being a master public signature key and the leaves of the master merkle tree being master One-Time Signature ("OTS") public keys, associated with master OTS private keys,
- trigger, by said manager device, generation of a predetermined number of slave merkle trees, wherein each leaf of the slave merkle trees is an OTS public key associated with an OTS private key, said predetermined number of slave merkle trees being equal to the number of tamper-proof computing devices and each generated slave merkle tree has its root signed by one of the master OTS private keys of the master merkle tree to build-up a multi-tree structure,
- for each message to be signed:
  - select, by said manager device, one of the signing tamper-proof computing devices for signing,
  - dynamically assign, by said manager device, one yet unassigned generated slave merkle tree to said signing tamper-proof computing device for issuance of one signature only,
  - generate and sending, by said manager device to said signing tamper-proof computing device a command comprising said message to be signed, data enabling obtaining the OTS private key of the assigned slave merkle tree to be used to generate an OTS signature of the message to be signed, and a state value associated to said assigned slave merkle tree and keeping track of the OTS private keys of said assigned slave merkle tree already used for generating a signature,
  - obtain, by said signing tamper-proof computing device, a signing OTS private key from said data enabling to obtain an obtaining the an OTS private key,
  - generate, by said signing tamper-proof computing device, an OTS signature of said message to be signed with said signing OTS private key,
  - update, by said signing tamper-proof computing device, said state value associated to said assigned slave merkle tree such that said obtained OTS private key cannot be used anymore for generating signatures,
  - generate a stateful hash based signature of said message to be signed from said generated OTS signature using an authentication path, in the slave merkle tree assigned to said signing tamper-proof computing device, of the OTS public key corresponding to said obtained OTS private key,
- said generated stateful hash based signatures being configured to be verified by a verification process which uses the master public signature key at the root of the master merkle tree as the only public signature key.

* * * * *